United States Patent
Moll et al.

(10) Patent No.: US 9,424,811 B2
(45) Date of Patent: Aug. 23, 2016

(54) DIGITAL COLLAGE CREATION KIT

(71) Applicant: Crayola LLC, Easton, PA (US)

(72) Inventors: Joseph Thomas Moll, Bethlehem, PA (US); Brian Nemeckay, Belvidere, NJ (US); Stephen Weiss, Easton, PA (US)

(73) Assignee: Crayola LLC, Easton, PA (US)

( * ) Notice: Subject to any disclaimer, the term of this patent is extended or adjusted under 35 U.S.C. 154(b) by 113 days.

(21) Appl. No.: 14/213,526

(22) Filed: Mar. 14, 2014

(65) Prior Publication Data

US 2014/0267117 A1    Sep. 18, 2014

Related U.S. Application Data

(60) Provisional application No. 61/788,349, filed on Mar. 15, 2013.

(51) Int. Cl.
| G09G 5/00 | (2006.01) |
| G06T 13/00 | (2011.01) |
| G09G 5/377 | (2006.01) |
| G06T 13/80 | (2011.01) |
| G06T 11/60 | (2006.01) |

(52) U.S. Cl.
CPC .............. *G09G 5/377* (2013.01); *G06T 11/60* (2013.01); *G06T 13/80* (2013.01)

(58) Field of Classification Search
None
See application file for complete search history.

(56) References Cited

U.S. PATENT DOCUMENTS

| 5,277,302 | A | 1/1994 | Seisa |
| 5,420,607 | A | 5/1995 | Miller et al. |
| 5,957,697 | A | 9/1999 | Iggulden et al. |
| 6,098,793 | A | 8/2000 | Jaksha |
| 6,123,362 | A * | 9/2000 | Squilla ............. H04N 1/3875 281/31 |
| 6,535,215 | B1 | 3/2003 | DeWitt et al. |
| 6,608,631 | B1 * | 8/2003 | Milliron ............ G06T 13/00 345/619 |
| 6,745,907 | B2 | 6/2004 | Kjelgaard |
| 6,921,336 | B1 | 7/2005 | Best |
| 6,958,752 | B2 * | 10/2005 | Jennings, Jr. ....... G06T 19/20 345/419 |
| 7,079,153 | B2 | 7/2006 | Derry et al. |
| 7,532,771 | B2 * | 5/2009 | Taylor .............. G06T 11/60 358/450 |
| 7,567,263 | B2 * | 7/2009 | Georgiev .......... G06T 11/001 345/156 |
| 8,139,036 | B2 * | 3/2012 | Do ................. G06F 3/0421 345/173 |
| 8,493,408 | B2 | 7/2013 | Williamson et al. |
| 8,760,391 | B2 | 6/2014 | Hawkins |
| 8,896,621 | B1 * | 11/2014 | Sipher ............. G06F 3/04883 345/418 |
| 8,963,868 | B2 * | 2/2015 | Nakamura ......... G06F 3/04883 345/173 |

(Continued)

OTHER PUBLICATIONS

Non-Final Office Action dated Jun. 18, 2015 in U.S. Appl. No. 14/213,544, 8 pages.

(Continued)

*Primary Examiner* — M Good Johnson

(74) *Attorney, Agent, or Firm* — Shook, Hardy and Bacon L.L.P

(57) ABSTRACT

A digital collage creation kit is provided. The digital collage creation kit may include a digital photo cutter, a digital stamper, and a digital transforming tool. The digital photo cutter, the digital stamper, and the digital transforming tool may be configured to interact with a touch-screen surface of a computing device executing the digital collage creation kit application. Upon executing the digital collage creation kit application by the computing device, the digital collage creation kit may generate a digital collage creation environment, in which a digital collage may be created based on input received from one or more of the digital photo cutter, the digital stamper, and the digital transforming tool.

20 Claims, 13 Drawing Sheets

(56) References Cited

U.S. PATENT DOCUMENTS

| | | | |
|---|---|---|---|
| 9,182,832 B2* | 11/2015 | Natori | G06F 3/0308 |
| 9,182,882 B2* | 11/2015 | Fowler | G06T 17/30 |
| 2002/0171746 A1 | 11/2002 | Stephany et al. | |
| 2003/0104343 A1* | 6/2003 | Rehkemper | G09B 11/04 |
| | | | 434/85 |
| 2004/0156556 A1* | 8/2004 | Lopez | G06T 3/0093 |
| | | | 382/276 |
| 2006/0001650 A1* | 1/2006 | Robbins | G06F 3/0421 |
| | | | 345/173 |
| 2006/0274070 A1 | 12/2006 | Herman et al. | |
| 2008/0123993 A1* | 5/2008 | Widdowson | G06T 11/60 |
| | | | 382/284 |
| 2008/0156667 A1 | 7/2008 | Huggins | |
| 2009/0002327 A1* | 1/2009 | Wilson | G06F 3/041 |
| | | | 345/173 |
| 2009/0066700 A1 | 3/2009 | Harding et al. | |
| 2009/0079743 A1 | 3/2009 | Pearson et al. | |
| 2009/0263038 A1* | 10/2009 | Luo | G06K 9/32 |
| | | | 382/254 |
| 2010/0199227 A1* | 8/2010 | Xiao | G06F 3/0481 |
| | | | 715/863 |
| 2010/0223568 A1* | 9/2010 | Quek | G06T 11/60 |
| | | | 715/765 |
| 2011/0099517 A1* | 4/2011 | Mull | G06F 3/04845 |
| | | | 715/810 |
| 2011/0113624 A1 | 5/2011 | Harada | |
| 2011/0175821 A1* | 7/2011 | King | G06F 3/04883 |
| | | | 345/173 |
| 2011/0191719 A1* | 8/2011 | Hinckley | G06F 3/048 |
| | | | 715/835 |
| 2011/0285748 A1* | 11/2011 | Slatter | G06T 11/60 |
| | | | 345/629 |
| 2012/0122531 A1 | 5/2012 | Aoki et al. | |
| 2012/0122553 A1 | 5/2012 | Bunch et al. | |
| 2012/0142415 A1 | 6/2012 | Lindsay | |
| 2012/0179995 A1* | 7/2012 | Cok | H04N 1/00196 |
| | | | 715/810 |
| 2012/0218262 A1 | 8/2012 | Yomdin et al. | |
| 2012/0275704 A1* | 11/2012 | Cok | H04N 1/00196 |
| | | | 382/190 |
| 2012/0321217 A1* | 12/2012 | Cok | G06T 7/0026 |
| | | | 382/284 |
| 2013/0063418 A1 | 3/2013 | Kaschalk et al. | |
| 2013/0120281 A1 | 5/2013 | Harris | |
| 2013/0120436 A1 | 5/2013 | Krishnaswamy et al. | |
| 2013/0201354 A1 | 8/2013 | LaScolea et al. | |
| 2013/0222385 A1* | 8/2013 | Dorsey | G06T 11/20 |
| | | | 345/427 |
| 2013/0239104 A1 | 9/2013 | Savant et al. | |
| 2013/0258117 A1 | 10/2013 | Penov et al. | |
| 2014/0050367 A1 | 2/2014 | Chen et al. | |
| 2014/0071251 A1 | 3/2014 | Nakamura et al. | |
| 2014/0129990 A1 | 5/2014 | Xin et al. | |
| 2014/0168098 A1* | 6/2014 | Lucero | G06F 3/041 |
| | | | 345/173 |
| 2014/0197922 A1 | 7/2014 | Stanwood et al. | |
| 2014/0300722 A1 | 10/2014 | Garcia | |
| 2014/0307980 A1* | 10/2014 | Hilt | G06T 11/60 |
| | | | 382/284 |
| 2015/0170418 A1 | 6/2015 | Flynn et al. | |

OTHER PUBLICATIONS

First Action Interview Pre-Interview Communication dated Jun. 19, 2015 in U.S. Appl. No. 14/211,815, 5 pages.
First Action Interview Office Action dated Sep. 9, 2015 in U.S. Appl. No. 14/211,815, 8 pages.
First Action Interview Preinterview Communication dated Sep. 17, 2015 in U.S. Appl. No. 14/213,564, 5 pages.
Notice of Allowance dated Sep. 29, 2015 in U.S. Appl. No. 14/213,544, 6 pages.
Avrahami et al., Portico: Tangible Interaction on and around a Tablet, Oct. 16-19, 2011, ACM, pp. 347-356, date unknown.
Clark et al, An Interactive Augmented Reality Coloring Book, Dec. 12-15, 2011, SIGGRAPH Asia 2011. pp. 1.
Fat Brain Toys, Art 101 Double Sided Trifold Easel Art Set—179 pc, Oct. 20, 2010, http://web.archive.org/web/20101030082932/http://www.fatbraintoys.com/toy_companies/dm_creations/art_101_double_sided_trifold_easel_art_set_179_pc.cfm, pp. 1-2.
First Action Interview Preinterview Communication dated Nov. 13, 2015 in U.S. Appl. No. 14/213,586, 7 pages.
First Action Interview Office Action dated Jan. 15, 2016 in U.S. Appl. No. 14/213,564, 3 pages.
Notice of Allowance dated Jan. 29, 2016 in U.S. Appl. No. 14/213,586, 22 pages.
Final Office Action dated Feb. 26, 2016 in U.S. Appl. No. 14/211,815, 17 pages.
Final Office Action dated May 25, 2016 in U.S. Appl. No. 14/213,564, 14 pages.

* cited by examiner

DIGITAL COLLAGE CREATION KIT

CROSS-REFERENCE TO RELATED APPLICATIONS

This application claims priority to U.S. Provisional Application Ser. No. 61/788,349, filed Mar. 15, 2013, entitled "Personalized Digital Animation and Digital Collage Creation Kit," and is related by subject matter to the following concurrently filed U.S. application Ser. No. 14/213,564, entitled "Personalized Digital Animation Kit,". The entirety of the aforementioned applications are incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter.

In brief and at a high level, this disclosure describes, among other things, a personal animation kit for animating personal photos within virtual scenes. In embodiments, the personal animation kit includes a digital stylus, a digital stamper, a carrying case, and an application for execution by a computing device. A user can take a photo of a person, such as the user or another person, and animate the image using the personal animation kit. In embodiments, the application brings the static photo to life, as the photo may be enhanced with animation features such as jumping, running, doing flips or karate, and the like. The personal animation kit may be used to create animation movies featuring the animated image of a person. In some embodiments, the personal animation kit provides a background designing feature for designing a customized background. In other embodiments, the personal animation kit provides template backgrounds, such as a basketball court. The digital stamper may be used to generate additional animated images that a user may create or select from a menu of included options, such as dribbling a basketball. Enhanced images created with the personal animation kit may be saved, emailed, or printed. The digital tools in the personal animation kit may be stored in a hard-shell storage case designed to clip onto a computing device, such as an iPad®.

Embodiments of the invention also include a digital collage creation kit for, among other things, enhancing or transforming photos into digital collages. The digital collage creation kit may include, in embodiments, a digital photo cutter, a digital stamper, a digital transforming tool, and a carrying case, such as a hard-shell carrying case or a soft pouch. A digital photo may be uploaded into the application where the digital photo cutter may then be used to "cut" away unwanted portions of the photo. In embodiments, the digital stamper then allows a user to add animated images and phrases to the image, while the digital transforming tool lets the user create photo-morphing effects like stretching and melting. A user may generate a customized background to incorporate into the collage, or may select from a variety of template backgrounds provided in the application, such as a skateboarding park. A digital collage made with the kit may be displayed in a digital gallery, distributed by emailing, or shared by printing out the display screen. A user may also store the digital tools for the digital collage creation kit in a hard-shell storage case designed to clip onto a computing device, such as an iPad®.

DESCRIPTION OF THE DRAWINGS

Illustrative embodiments of the invention are described in detail below with reference to the attached drawing figures, and wherein.

DETAILED DESCRIPTION

Figure 1:
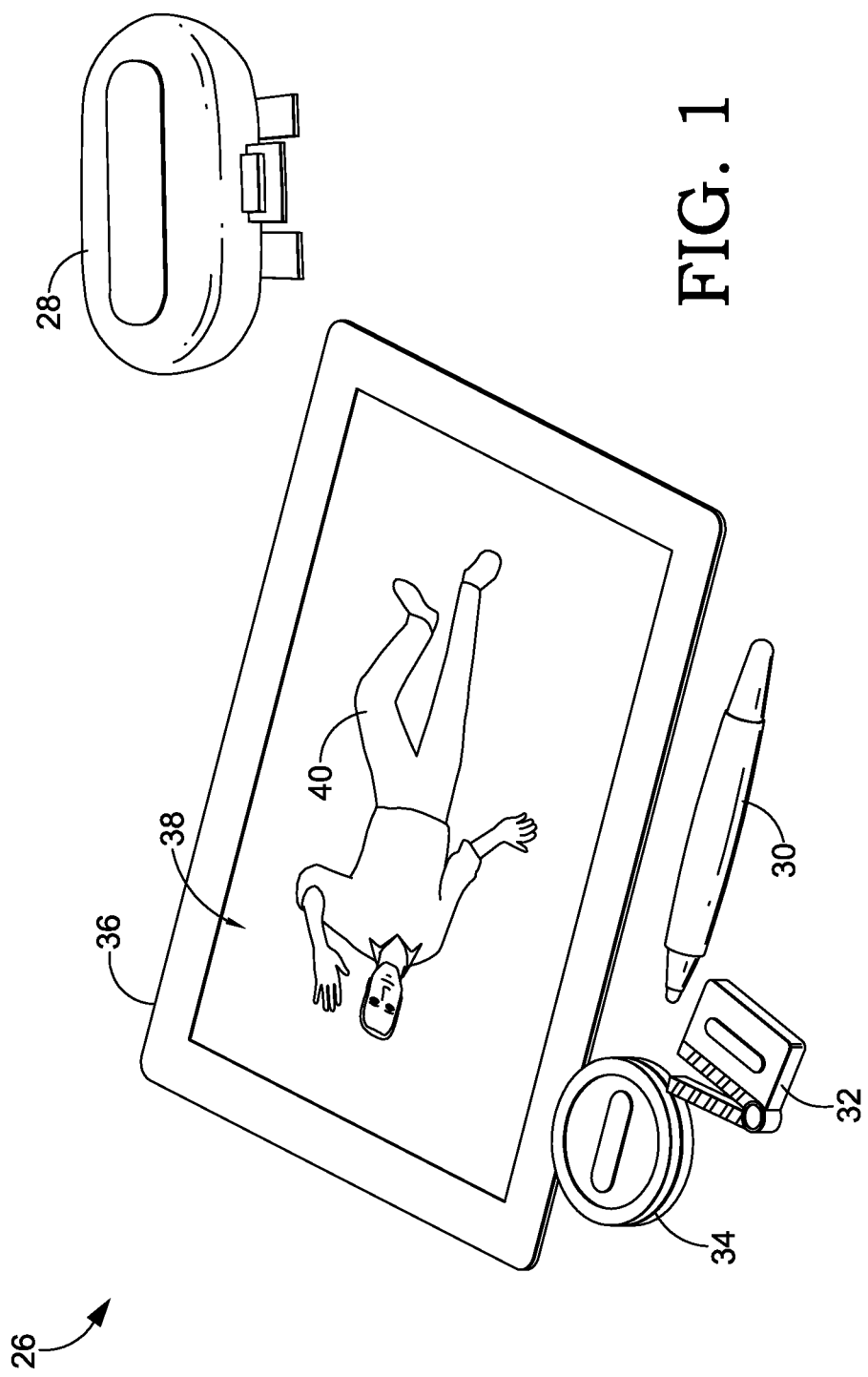
FIG. 1 is a top perspective view of a personal animation kit, in accordance with an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include a personal animation kit for, among other things, animating personal photos within virtual scenes. The personal animation kit may include, in embodiments, a digital stylus, a digital stamper, a carrying case, and an application for execution by a computing device. A user can take a photo of a person, such as the user or another person, and animate the image using the personal animation kit. In embodiments, the application brings the static photo to life, as the photo may be enhanced with animation features such as jumping, running, doing flips or karate, and the like. The personal animation kit may be used to create animation movies featuring the animated image of a person. In some embodiments, the personal animation kit provides a background designing feature for designing a customized background. In other embodiments, the personal animation kit provides template backgrounds, such as a basketball court. The digital stamper may be used to generate additional animated images that a user creates or selects from a menu of included options, such as dribbling a basketball. Enhanced images created with the personal animation kit may be saved, emailed, or printed. The digital tools in the personal animation kit may be stored in a hard-shell storage case designed to clip onto a computing device, such as an iPad®.

Embodiments of the invention also include a digital collage creation kit for, among other things, enhancing or transforming photos into digital collages. The digital collage creation kit may include, in embodiments, a digital photo cutter, a digital stamper, a digital transforming tool, and a hard-shell carrying case. A digital photo may be uploaded into the application where the digital photo cutter may be used to "cut" away unwanted portions of the photo. In embodiments, the digital stamper then allows a user to add animated images and phrases to the image, while the digital transforming tool lets the user create photo-morphing effects like stretching and melting. A user may generate a customized background to incorporate into the collage, or may select from a variety of template backgrounds provided in the application, such as a skateboarding park. A digital collage made with the kit may be displayed in a digital gallery, distributed by emailing, or shared by printing out the display screen. A user may also store the digital tools for the digital collage creation kit in a hard-shell storage case designed to clip onto a computing device, such as an iPad®.

Accordingly, in one embodiment, a digital collage creation kit is provided. The digital collage creation kit may include an activation feature for a digital collage creation kit application, as well as at least one of the following digital input devices: a digital photo cutter, a digital stamper, and a digital transforming tool. The digital photo cutter, the digital stamper, and the digital transforming tool may be configured to interact with a touch-screen surface of a computing device executing the digital collage creation kit application.

In further embodiments, a method of providing an interactive digital collage is provided. The method may include presenting, on a touch-screen display of a computing device, a first instance of a digital collage creation environment. The digital collage creation environment may be presented on the touch-screen display of the computing device in response to executing an application on the computing device. The method may further include receiving, by way of the digital collage creation environment, at least one input from one or more of the following: a digital photo cutter, a digital stamper, and a digital transforming tool. The digital photo cutter, digital stamper, and digital transforming tool may be configured to interact with the touch-screen surface of the computing device. Additionally, the method may include presenting, on the touch-screen display of the computing device, a second instance of the digital collage creation environment, wherein the second instance corresponds to the received at least one input.

In yet another embodiment, a digital collage creation kit is provided. The kit may include an activation feature for an application that when executed by a computing device generates a digital collage creation environment in which a digital collage is created based on user input. The kit may further include at least one of the following: a digital photo cutter comprising a single-point stylus for selecting an item in the digital collage; a digital stamper comprising a multiple touch-point stamper for adding one or more new items to the digital collage; and a digital transforming tool comprising a two-point stylus for creating one or more morphing effects within the digital collage. The digital photo cutter, digital stamper, and digital transforming tool may be configured to interact with a touch-screen surface of the computing device.

With reference now to the figures, apparatus, methods, and systems for providing a personal animation kit and a digital collage creation kit are described in accordance with embodiments of the invention. Various embodiments are described with respect to the figures in which like elements are depicted with like reference numerals.

Figure 21:
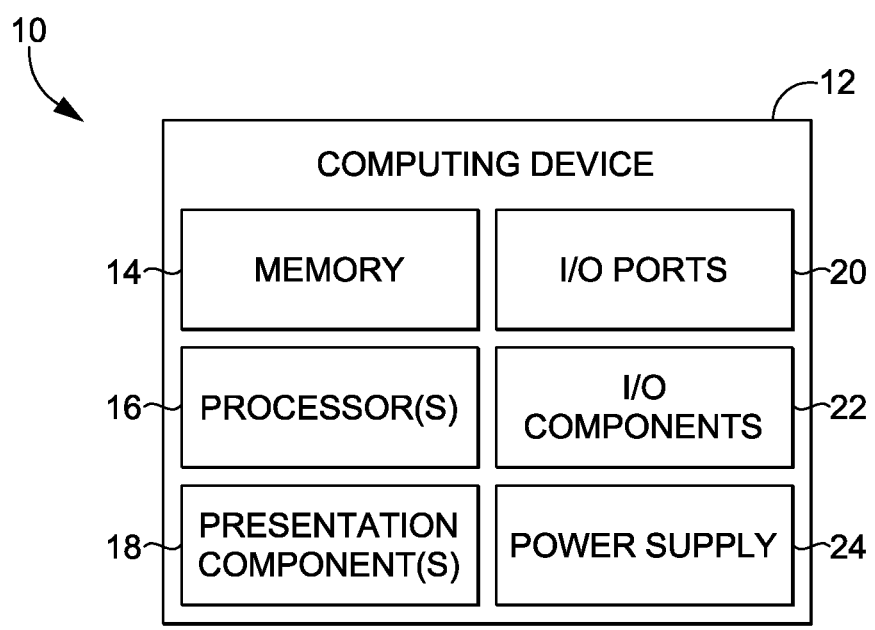
FIG. 21 is an exemplary computing system for executing an application in accordance with embodiments of the invention.

Referring initially to FIG. 21, an exemplary operating environment 10 in which embodiments of the present invention may be implemented is described below to provide a general context for various aspects of the present invention. Exemplary operating environment 10 includes a computing device 12, which is but one example of a computing environment for use with the present invention. The computing device 12 is not intended to suggest any limitation as to the scope of use or functionality of embodiments of the invention, and should not be interpreted as having any dependency or requirement relating to any one component nor any combination of components illustrated. As one skilled in the art would recognize, one or more of the components of operating environment 10 may be used to execute an application associated with embodiments of the invention.

Computing device 12 may include hand-held devices, consumer electronics, general-purpose computers, more specialty computing devices, touch-pad computing devices, touch-screen computing devices, and the like. Embodiments of the invention may be described in the general context of computer code or machine-useable instructions, including computer-useable or computer-executable instructions such as program modules, being executed by the computing device 12. The computing device 12 typically includes a variety of computer-readable media, which may be any available media that is accessible by the computing device 12, such as computer storage media that stores computer-executable instructions for executing by the computing device 12. In one embodiment, computing device 12 is a touch-screen device having a camera, such as an iPod Touch®, iPad®, and/or an iPhone® device provided by Apple® Inc.

As shown in the example in FIG. 21, the computing device 12 includes the following components: a memory 14, one or more processors 16, one or more presentation components 18, one or more input/output (I/O) ports 20, one or more I/O components 22, and an illustrative power supply 24. As will be understood, the components of exemplary computing device 12 may be used in connection with one or more embodiments of the invention. In embodiments, computing device 12 may include fewer components than those depicted in FIG. 21, or other components in addition to those depicted in FIG. 21. In one embodiment, the computing device 12 may execute a digital collage creation kit application to provide a digital collage creation environment, such as the digital collage creation environment 87 of FIG. 8.

The memory 14 includes computer-storage media in the form of volatile and/or nonvolatile memory that may be removable, non-removable, or a combination thereof. The computing device 12 also includes one or more processors 16 that read data from various entities such as the memory 14 or the I/O components 22. The presentation component(s) 18 present data indications to a user or other device, such as a display device, speaker, printing component, vibrating component, and the like. The I/O ports 20 allow the computing device 12 to be logically coupled to other devices, while the I/O components 22 may include a microphone, joystick, game pad, satellite dish, scanner, printer, wireless device, and a controller, such as a stylus, a keyboard and a mouse, a natural user interface (NUI), and the like.

Turning now to FIG. 1, an exemplary personal animation kit 26 includes a hard-shell storage case 28, a digital stylus 30, a digital clap board 32, and a digital stamper 34. In one embodiment, the personal animation kit 26 also includes an application for execution by a computing device 36 having a display screen 38. In embodiments, the display screen 38 is a touch-screen display. The digital clap board 32 may be used to indicate when to stop and start an animation. As shown in FIG. 1, a user may take a picture of a person (such as the user) to provide the full-body photo 40 displayed on the display screen 38. The full-body photo 40 is then manipulated according to embodiments of the invention to produce a personal animation scene. In embodiments, the digital stylus 30 is a one-point stylus for use with open-coloring on a background, such as a background presented on the display screen 38.

Figure 2:
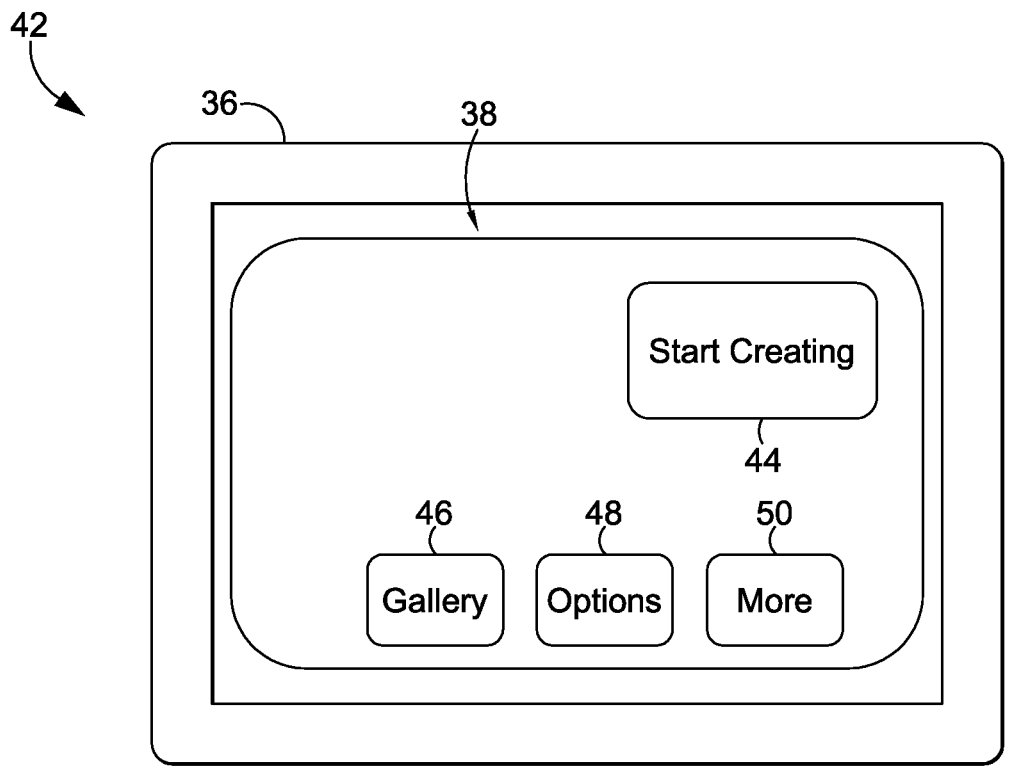
FIG. 2 is a top view of an exemplary user interface, in accordance with an embodiment of the invention.

With reference to FIG. 2, a user interface 42 associated with the application of the personal animation kit 26 may include individual indicators for selection by a user, such as a "start creating" indicator 44, a "gallery" indicator 46, an "options" indicator 48, and a "more" indicator 50. As such, in some embodiments, the simplicity of a user interface of the personal animation kit 26 assists the user in quickly generating animated photos.

Figures 3, 4:
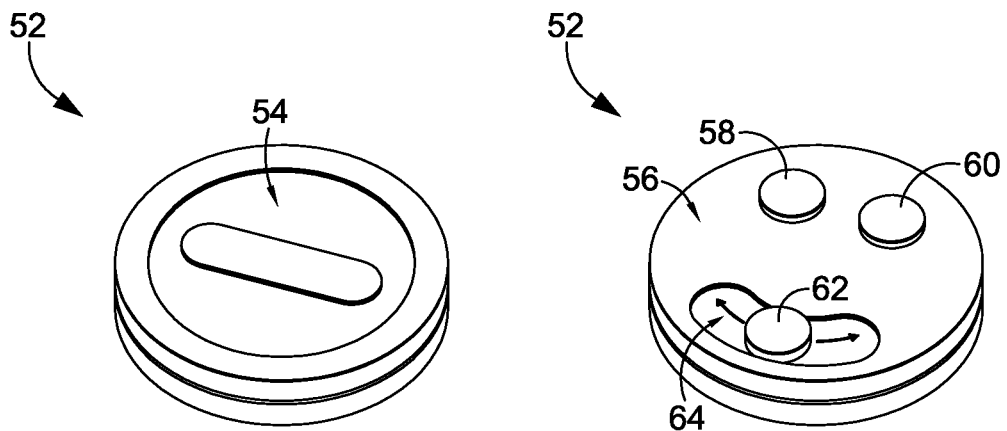
FIG. 3 is a top perspective view of a digital stamping tool, in accordance with an embodiment of the invention.
FIG. 4 is a bottom perspective view of the digital stamping tool of FIG. 3, in accordance with an embodiment of the invention.

As discussed above, embodiments of the personal animation kit 26 may include a digital stamper 34, which may be used to add additional enhancements and/or animated effects based on contacting the display screen 38 (i.e., a touch-screen screen) of the computing device 36. In the example of FIGS. 3-4, a multiple touch-point digital stamper 52 has a top surface 54 and a bottom surface 56. When the bottom surface 56 is placed on the touch-screen of a computing device 36, one or more touch-points may contact the surface, such as stationary touch-points 58 and 60, and translating touch-point 62. In embodiments, to determine which enhancements to generate based on contact with the digital stamper 52, the application is configured to identify a particular orientation of the translating touch-point 62 relative to the two other stationary touch-points 58 and 60. The digital stamper 34 included in the personal animation kit 26 may include the features of the digital stamper 52 described with respect to FIGS. 3-4.

Figure 6:
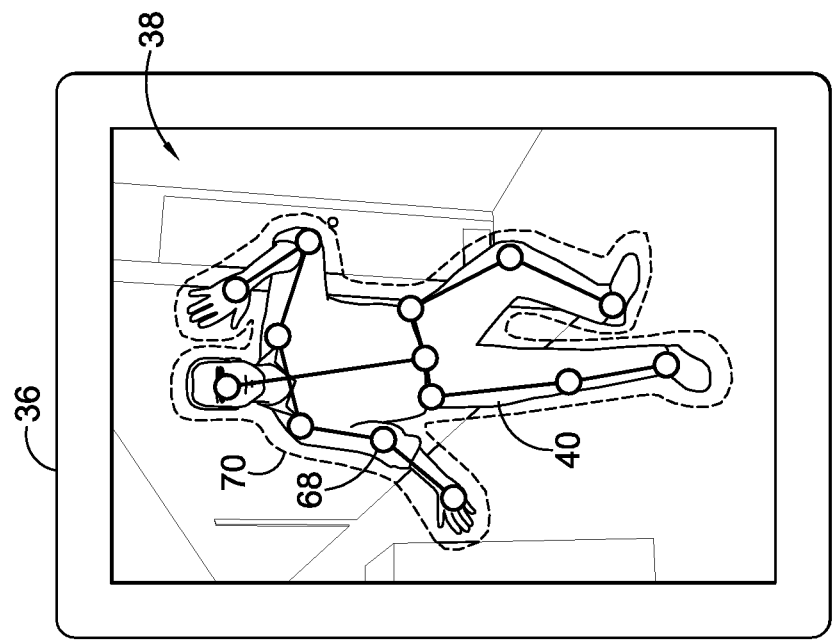
FIG. 6 is a top view of a computing device executing an application, in accordance with an embodiment of the invention.
Figure 5:
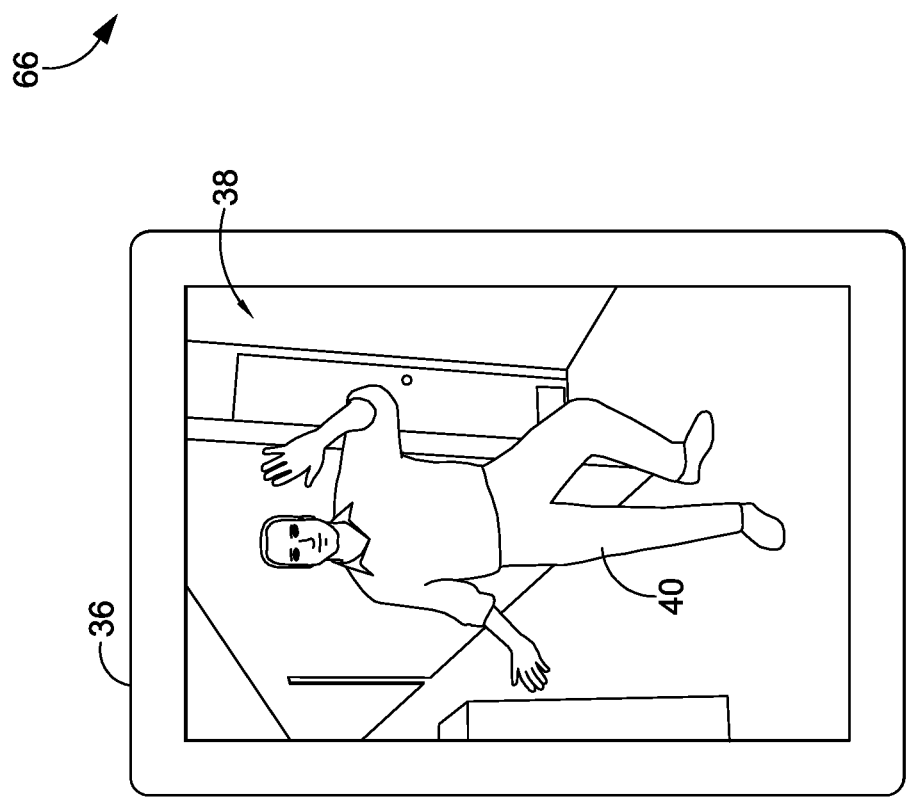
FIG. 5 is a top view of a computing device executing an application, in accordance with an embodiment of the invention.

Turning now to the example of FIGS. 5-6, a creating environment 66 for use with the personal animation kit 26 displays the full-body photo 40 on the display screen 38. In embodiments, a user is prompted by the application associated with the personal animation kit 26 to take a picture of his full body. As shown in FIG. 5, a full-body photo 40 of a user may be displayed on the display screen 38, with background items remaining behind the user. FIG. 6, illustrates the way in which a user may apply "bones" to the full-body photo 40 by marking joint indicators 68 at particular points on the full-body photo 40. In embodiments, the joint indicators 68 indicate to the application where to cut the full-body photo 40 for creating canned animations. Additionally, as shown in the embodiment of FIG. 6, the joint indicators 68 are used to apply a mask 70 around a perimeter of the full-body photo 40 that cuts the user image from the background. In some embodiments, a user may adjust the distance between joint indicators 68 and the edge of the mask 70.

Figure 7:
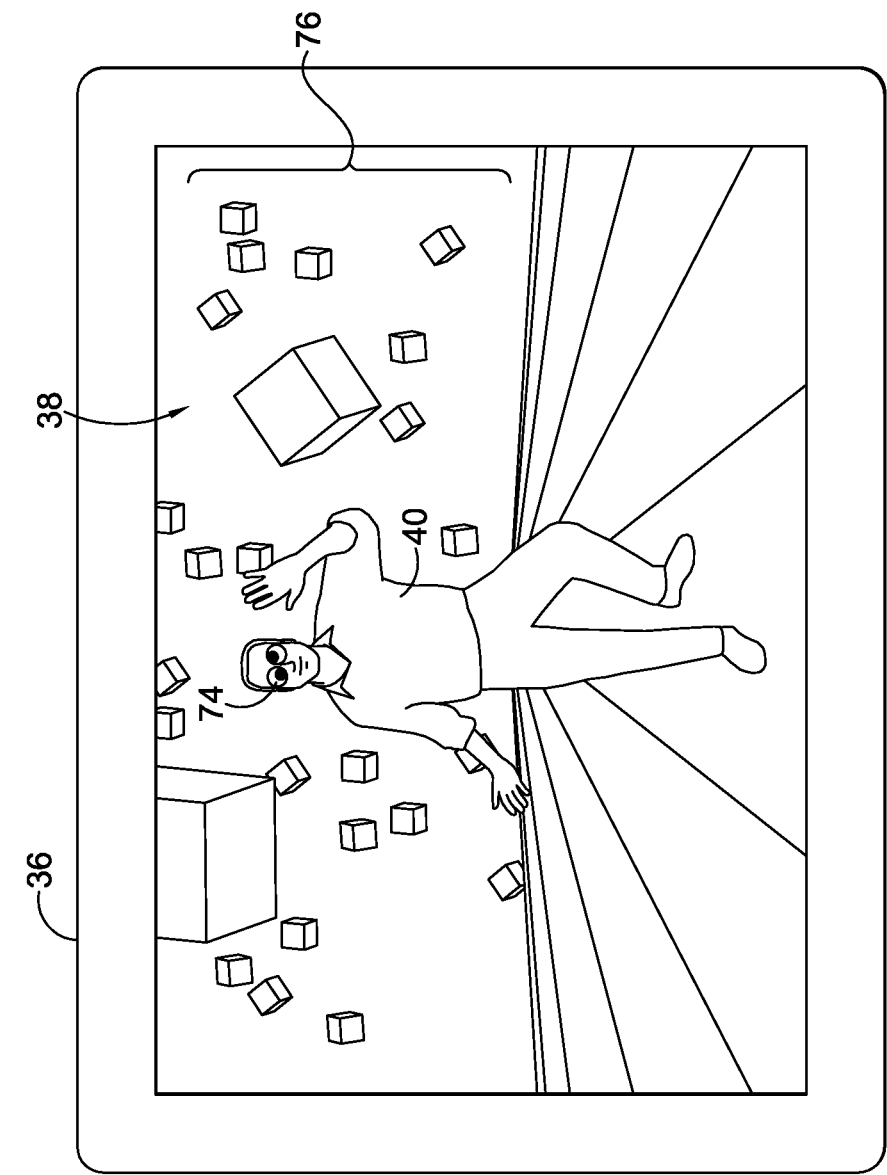
FIG. 7 is a top view of a computing device executing an application, in accordance with an embodiment of the invention.

Accordingly, after receiving the selection of joint indicators 68, embodiments of the application apply the mask 70 to cut out the human image from the background with as little background space as possible around a perimeter of the human image. As shown in FIG. 7, an enhanced animation 72 may then be created using the cut-out full-body photo 40. For example, a background 76 may be selected for placing behind the cut-out full-body photo 40. The background 76 may be a predetermined background, or may be a freely-drawn amount of color in a selected background. In further embodiments, the enhanced animation 72 is "enhanced" by stamping on animated effects with the digital stamper 34, such as stamping on googly eyes, lips, fire hair, super shoes, and other accessories to add to the background and/or to the cut-out full-body photo 40.

Additionally, an animation sequence may be selected in embodiments of the invention, such as a dancing scene that automatically animates the cut-out full-body photo 40 on a dance floor, as in FIG. 7. In one embodiment, an animation sequence may be executed for a predetermined amount of time, such as a five-second animation clip. In some embodiments, a user may save and/or share an animation. For example, a user may save an animation as a five-second video, which may then be uploaded to a social media website. In further embodiments, a user may save a creation made by using the personal animation kit 26 for use in additional animations. In yet another embodiment, as part of the digital application provided with the personal animation kit 26, a user may be able to purchase additional digital enhancements for the application (i.e., "in-app purchases") that further enhance the user's experience.

In embodiments, the personal animation kit 26 includes a personal animation kit application that, upon execution by the computing device 36, is configured to provide animated personal photos within virtual scenes. In further embodiments, the personal animation kit 26 includes an activation feature for such a personal animation kit application. The activation feature may include an activation code and/or an activation indicator, such as a web page, website URL, or other indicator of a resource from which a user may access one or more features of the application. In some embodiments, user interaction with the activation feature enables and/or activates a personal animation kit application retrieved by using the activation feature, and/or a personal animation kit application associated with the activation feature. In further embodiments, a non-user-specific application, such as Crayola ColorStudio HD™, is downloaded from an external source, and the specific features for the personal animation kit application may then be activated and/or "unlocked," by an activation feature. In this instance, the activation feature may involve touching a component included in the user-specific kit to the touch-screen of the computing device 36 running the non-user-specific application. For example, a user may download ColorStudio HD™ to a computing device 36, and then touch a digital stamper included in a user-specific personal animation kit 26, such as the digital stamper 34 of FIG. 1, to the touch-screen of the computing device 36 in order to activate the personal animation kit application.

Upon enabling/activation, the personal animation kit application may be accessed, retrieved from, downloaded, and/or otherwise interacted with via a source separate from the personal animation kit 26. For example, the personal animation kit application may be accessed and/or downloaded from a website, a database, a data store, or any other external source that may provide applications. An example of an external source is the online iTunes® store.

Embodiments of the personal animation kit 26 further include an application that provides a first tier of options available to a user upon purchase of the personal animation kit 26, and a second tier of options available to the user upon "unlocking" a full mode of the personal animation kit 26. In one example, a user may purchase the personal animation kit 26, which may include an application that enables the user to access a "try me" mode of the product. The "try me" mode may allow, for example, a user to import only one photo and utilize a limited number of stamps and/or backgrounds, etc. In another example, the user may "unlock" a full mode of the purchased personal animation kit 26 to activate additional options such as access to additional backgrounds and stamps, the ability to import multiple photos, and other features of the personal animation kit 26 that may be limited and/or restricted based on which mode a user is executing. In one embodiment, a digital stamper 34 is used to unlock additional features of the personal animation kit 26. In other embodiments, the digital stamper 34, or another component included in the personal animation kit 26, may be used to activate and/or unlock a particular mode of the application, such as a limited mode or a full mode. In one embodiment, a particular user interaction screen associated with the personal animation kit application may be presented to a user for activation of the personal animation kit application and/or features. For example, additional enhancement options corresponding to the use of one or more of the digital tools may be enabled based on activation of the personal animation kit application.

Figure 8:
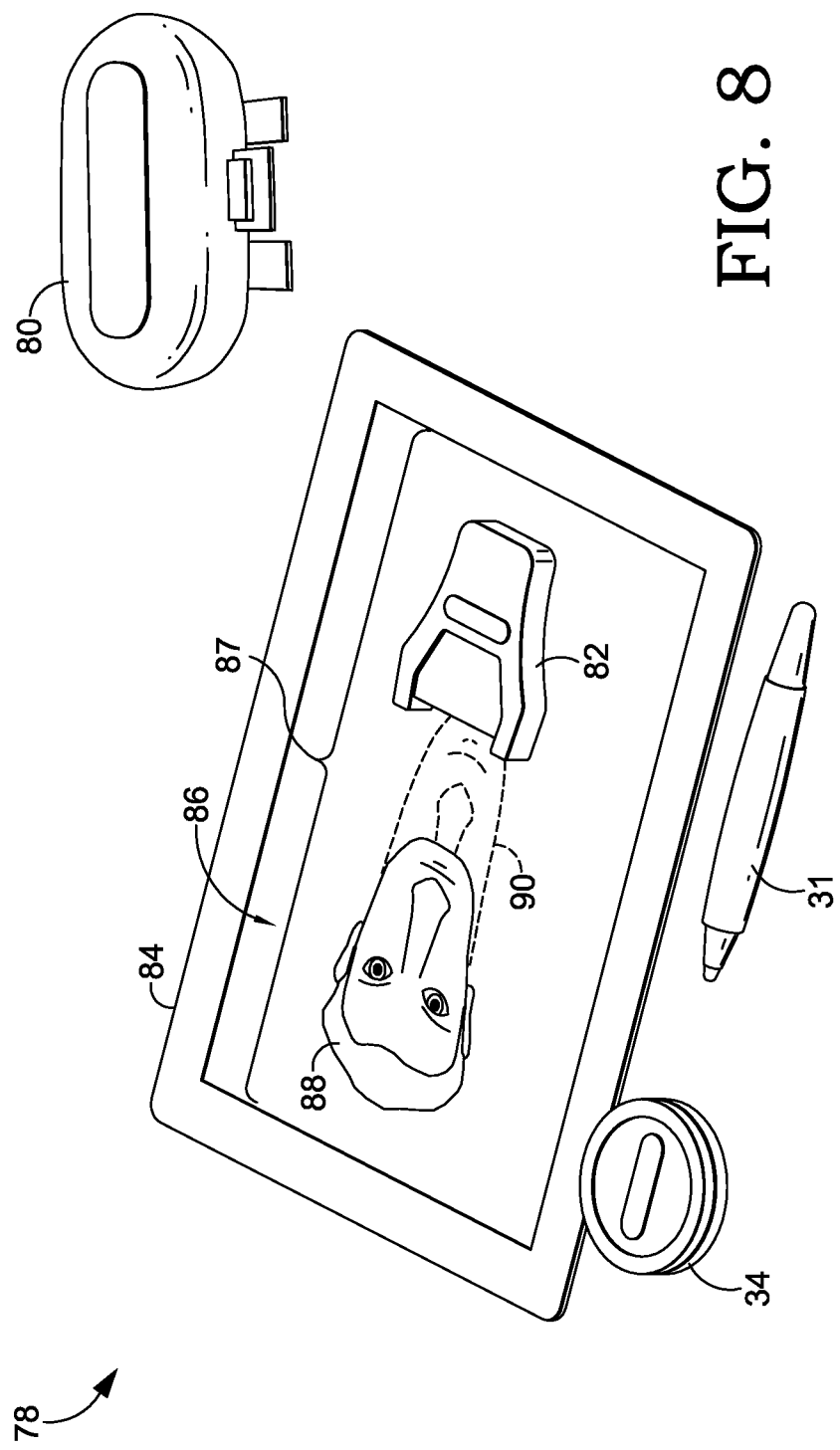
FIG. 8 is a top perspective view of a digital collage creation kit, in accordance with an embodiment of the invention.

Turning now to FIG. 8, a digital collage creation kit 78 is depicted according to embodiments of the invention. In one embodiment, the digital collage creation kit 78 includes a hard-shell storage case 80, a digital photo cutter 31, a digital stamper 34, and a digital transforming tool 82. In other embodiments, the digital collage creation kit 78 may include a soft pouch for storing and carrying the digital tools, instead of or in addition to the hard-shell storage case 80 shown in FIG. 8. In one embodiment, the digital collage creation kit 78 also includes an application for execution by a computing device 84, such as the exemplary computing device 12 of FIG. 21, having a touch-screen display 86. Upon execution by the computing device 84, the digital collage creation kit application may provide the digital collage creation environment 87 on a display screen, such as the touch-screen display 86. The digital collage creation environment 87 includes a digital collage creation area, in which a user may create a digital collage, and also provides a number of tools, features, items, effects, and menu options that may be utilized in creating the collage.

At a high level, a number of customized items, including photos, stamps, backgrounds, and special effects features may be selected or created within the digital collage creation environment 87 in order to create a digital collage. Various digital tools may be provided in the digital collage creation kit 78 to assist a user in creating the digital collage. Several exemplary tools are described briefly here, and in more detail below. In embodiments, the digital stamper 34 is used to add new items, as well as animated effects to new and existing items, to the digital collage. The digital stamper 34 may further include the functions and/or features associated with the multiple touch-point digital stamper 52, which was previously described with respect to FIGS. 3-4. The digital photo cutter 31 may include a one-point stylus for activating multiple different features, such as masking, applying photo filters, coloring, and the like. The digital transforming tool 82 may include a two-point stylus, which may be used to create a variety of photo effects, such as stretching, swirling, melting, morphing, blending, smearing, swiping, image twisting, color changing, pixelating, and/or smudging effects. Accordingly, the digital transforming tool 82 may produce a stretched image 90 of a user photo 88, as shown in the example of FIG. 8. Each of these kit components is discussed in greater detail below.

Figure 9:
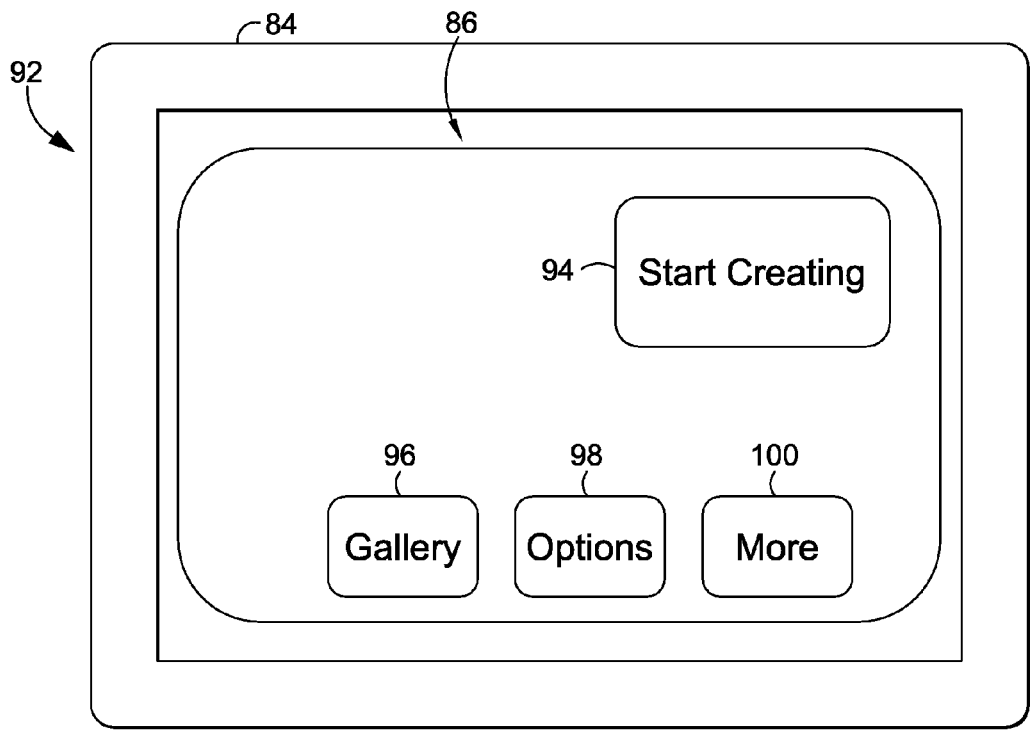
FIG. 9 is a top view of an exemplary user interface, in accordance with an embodiment of the invention.

As shown in FIG. 9, the application of the digital collage creation kit 78 may be executed to provide a user interface 92 with a variety of selectable indicators on the touch-screen display 86 of the computing device 84, such as the "start creating" indicator 94, the "gallery" indicator 96, the "options" indicator 98, and the "more" indicator 100. In embodiments, the core play pattern for the digital collage creation kit 78 is creating a collage using photos and provided elements, such as enhancements provided by the application. In one embodiment, a user is able to easily and quickly generate a digital collage via the user interface 92.

Figure 9A:
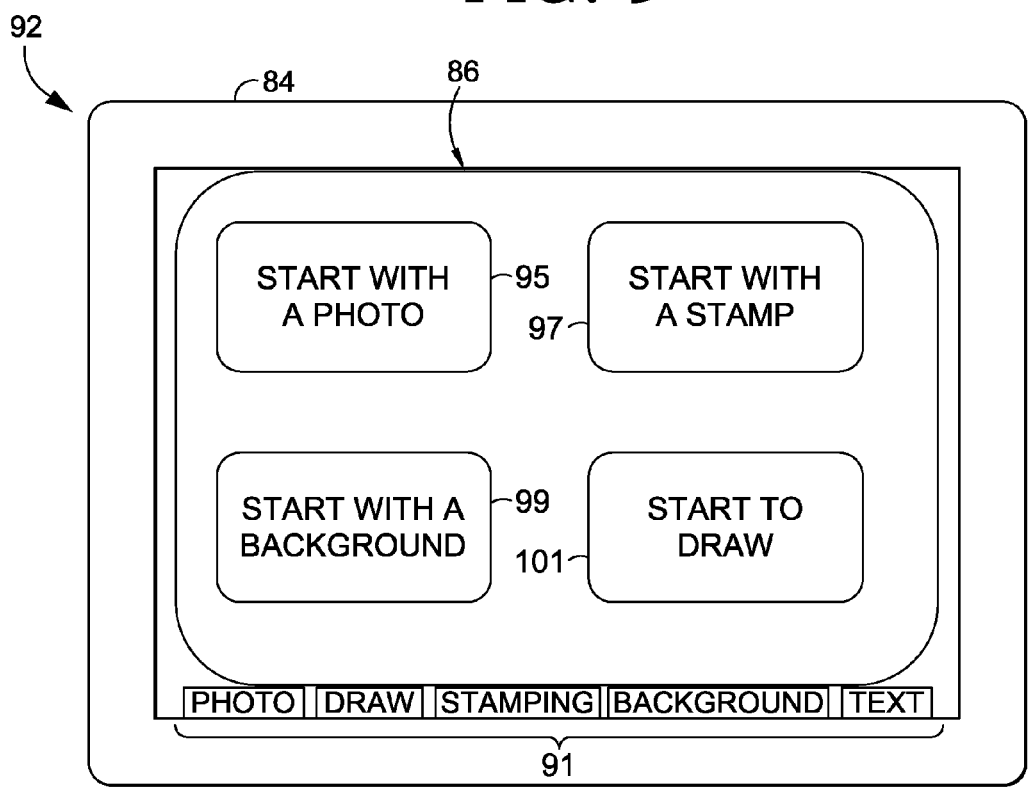
FIG. 9A is a top view of an exemplary user interface, in accordance with an embodiment of the invention.

FIG. 9A shows an additional user interface 93 that may be provided by the digital collage creation kit application in the digital collage creation environment 87. For example, upon selecting the "start creating" indicator 94 of FIG. 9, a user may be presented with the user interface 93, which includes, in embodiments, a "start with a photo" indicator 95, "start with a stamp" indicator 97, "start with a background" indicator 99, and "start to draw" indicator 101. These indicators may be used to navigate the digital collage creation environment 87 generated by the digital collage creation kit application. The various features and menu options associated with a selection of each of these indicators will be discussed below. As shown, the user interface 93 may further include a plurality of menu options 91.

As mentioned, the digital stamper 34 may include the stamp features and/or functions associated with the multiple touch-point digital stamper 52 of FIGS. 3-4. Specifically, the digital stamper 34 may be used to add new items, features, and/or enhancements to a digital collage created using the digital collage creation kit 78. The new features may include new figures, objects, animation effects, sound effects, as well as a variety of other features not previously included in a user's digital collage. For example, in embodiments, the digital stamper 34 provides for the addition of facial features, such as eyes, lips, hair, nose, ears, and other facial features, to a digital collage. The digital stamper 34 might also provide for the addition of accessories, such as clothing, a hat, or glasses. Additionally, the digital stamper 34 might be used to add new figures or objects, such as buildings, trees, flowers, animals, sports equipment, automobiles, or any number of other figures or objects. In some embodiments, the digital stamper 34 may be used to add one or more enhancements to a digital collage and/or a specific item in the digital collage. For example, the digital stamper 34 may be used to create enhancements such as inflating a part of an image stamped over by the digital stamper 34, blowing up a portion of an item in the digital collage (e.g., a chin or nose of a figure), making disproportionate enlargements to particular features (e.g., creating "bug eyes" on a figure), and the like. A user may add such items and/or features to a digital collage by selecting a stamp menu option within the digital collage creation environment 87, such as the "stamping" indicator from the user interface 127 of FIG. 18 or the "start with a stamp" indicator 97 of FIG. 9A, and then touching the touch-points of the digital stamper 34 to the touch-screen display 86 of the computing device 84. Additionally or alternatively, a user may add such items and/or features simply by touching the digital stamper 34 to the touch-screen of the computing device 84.

In embodiments, a user may select one stamp option from a plurality of stamp options in order to specify the feature that is to be added by the digital stamper 34. For example, a user may select a stamp option corresponding to a picture of a dog that is desired to be added to the digital collage. Similarly, a user may select a stamp option corresponding to an animated stamp or an interactive stamp that is desired to be added to the digital collage. An animated stamp might include, for example, googly eyes that move about, or eyebrows that wiggle. An interactive stamp might include a stamp that provides various options for user interaction. For example, an interactive stamp added by the digital stamper 34 may include animation and/or sound features that are responsive to a subsequent user interaction, such as a subsequent user selection of a portion of the interactive stamp. In one embodiment, the interactive stamp may provide one or more features, such as animation, sound, color changing, image desaturation, or other audible and/or visual changes to an otherwise stationary image, which are triggered by additional user interaction.

In further embodiments, a user customizes the animation that is applied to a particular stamp. Similarly, a user may customize an audio effect associated with a stamp by, for example, selecting the stamp that is to be associated with the audio effect, and then further selecting a prerecorded audio effect or recording a customized audio effect using a microphone on the computing device 84.

In manipulating photos in the digital collage creation environment 87, a digital transforming tool 82 may interact directly with the touch-screen display 86 to generate a variety of stretching, swirling, melting, morphing, blending, smearing, swiping, image twisting, color changing, pixelating, and/or smudging effects with regard to the digital content being altered on the touch-screen display 86. For example, a stretching effect may be applied to, among other things, elongate an image in one or more directions, such as the stretching effect applied to the user photo 88 to produce the stretched image 90 of FIG. 8. The digital transforming tool 82 may be used to create other distorting effects, as well.

Figure 10:
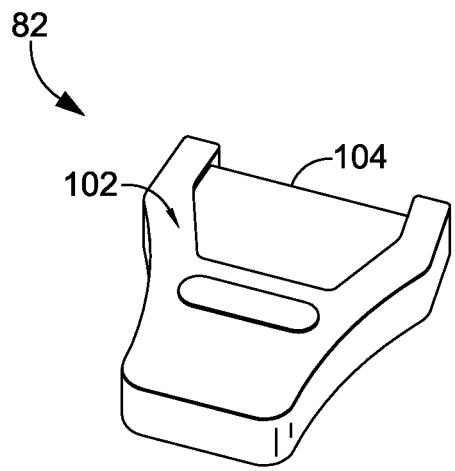
FIG. 10 is a top perspective view of a digital transforming tool, in accordance with an embodiment of the invention.
Figure 11:
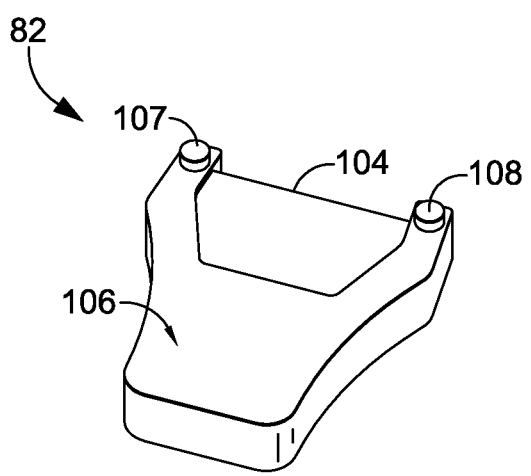
FIG. 11 is a bottom perspective view of the digital transforming tool of FIG. 10, in accordance with an embodiment of the invention.

With reference to FIGS. 10-11, the digital transforming tool 82 may include a top surface 102, a transforming edge 104, a bottom surface 106, and digital touch-points 107 and 108. As will be understood, the digital touch-points 107 and 108 may be configured to be detected by a computing device 84 having a touch-screen display 86 when the digital touch-points 107 and 108 come into contact with the touch-screen display 86. In embodiments, the digital touch-points 107 and 108 of the digital transforming tool 82 contact the touch-screen display 86, and the digital transforming tool 82 is then dragged across the touch-screen display 86, such that the digital touch-points 107 and 108 remain in contact with the touch-screen display 86 and are dragged across the touch-screen display 86, to produce one or more digital transformation effects. As such, in some embodiments, the digital transforming tool 82 is configured to interact with the touch-screen display 86 upon contact of both of the digital touch-points 107 and 108, and such contact of both touch-points with the touch-screen display 86 may be required before the corresponding morphing effects will be generated with respect to the digital photo, such as the user photo 88 of FIG. 8.

In some embodiments, the digital transforming tool 82 may be used to apply sound recording stamps to an image, such as stamping an image of lips that record and play back recorded sounds. The digital transforming tool 82 may also be used to select and rearrange elements within a digital collage. The digital photo cutter 31 may also be used to stamp an image, record and apply audio effects, and select and rearrange items. In this way, in some embodiments, the digital transforming tool 82, the digital stamper 34, and the digital photo cutter 31 may all provide similar features or functions.

As mentioned, a digital photo cutter 31 may be included in embodiments of the digital collage creation kit 78. In embodiments, the digital photo cutter 31 includes the functions and features associated with the digital stylus 30 of FIG. 1. In further embodiments, the digital photo cutter 31 is a single touch-point stylus, having a conductive tip configured to interact with the touch-screen display 86. Additionally, in some instances, the conductive tip of the digital photo cutter 31 may be activated only when a user holds a metal portion of the digital photo cutter 31, where the metal portion is located near the conductive tip of the digital photo cutter 31. In other words, the touch-point of the digital photo cutter 31 may be configured such that the touch-screen display 86 of the computing device 84 will detect the touch-point of the digital photo cutter 31 only when the user holds the digital photo cutter 31 in a certain way. Such a configuration may require a user to properly grip the digital photo cutter 31 in order to use it within the digital collage creation environment 87. Thus, a user may be encouraged to learn to grip writing utensils, generally, in a proper manner.

The digital photo cutter 31 may be used to interact with the digital collage creation environment 87 displayed on the touch-screen display 86 in a number of ways. For example, the digital photo cutter 31 may be used to navigate within the digital collage creation environment 87, such as by navigating and selecting menu options. The digital photo cutter 31 may also be used to select and rearrange features within a digital collage. Furthermore, the digital photo cutter 31 may be used to selectively add animation and audio effects to various features within a digital collage. For example, a user may touch the digital photo cutter 31 to the touch-screen display 86 in order to select a stamped figure. Upon selecting the stamped figure, the user may further be presented with options to animate the stamped figure, or add audio effects to the stamped figure. Additionally, the digital photo cutter 31 may be used to add drawing or coloring effects to a digital collage. The drawing and coloring options that may be included within a digital collage creation kit application are described in more detail below.

Figure 12:
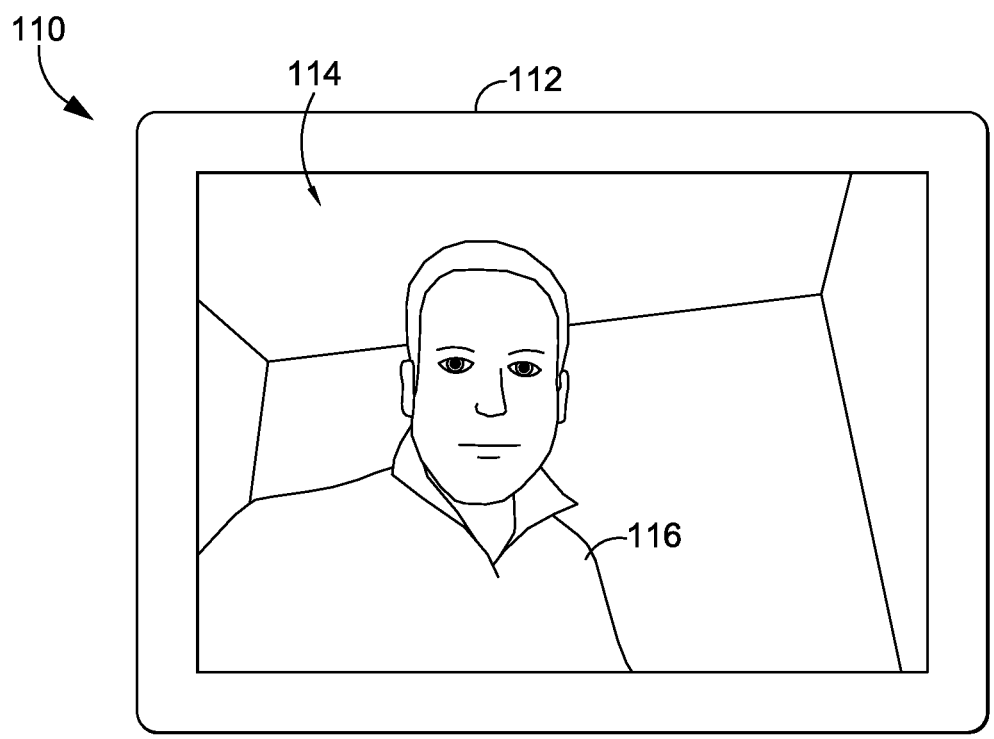
FIG. 12 is a top view of a computing device executing an application, in accordance with an embodiment of the invention.
Figure 13:
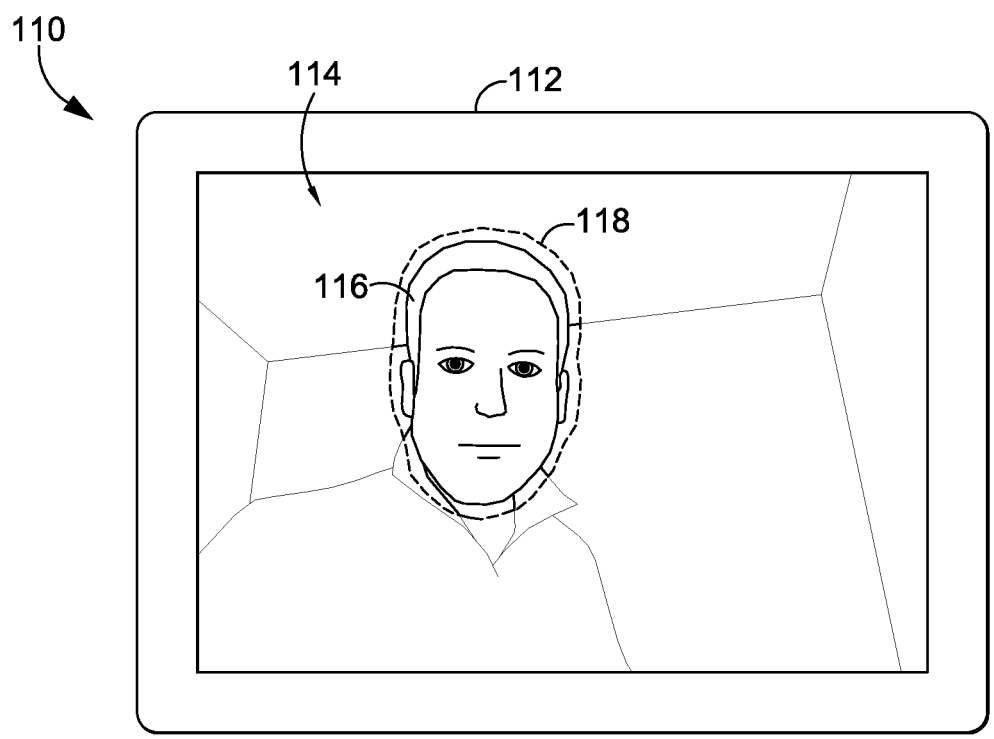
FIG. 13 is a top view of a computing device executing an application, in accordance with an embodiment of the invention.
Figure 14:
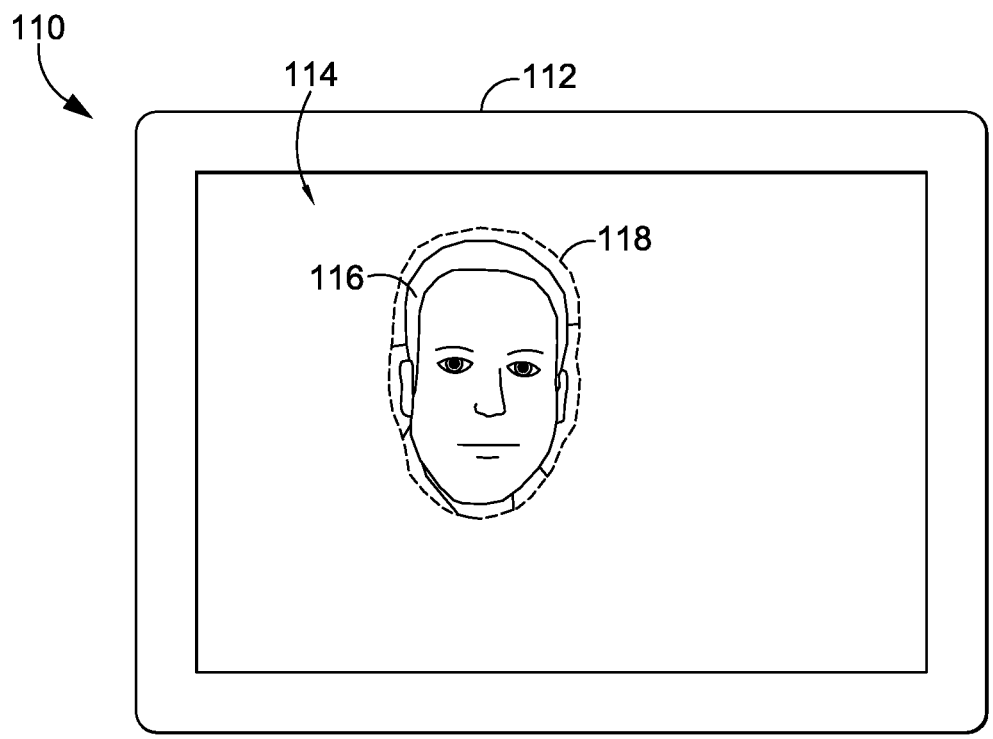
FIG. 14 is a top view of a computing device executing an application, in accordance with an embodiment of the invention.

Additional functions and features associated with the digital photo cutter 31 are described with respect to FIGS. 12-14. In FIG. 12, a creation environment 110 includes a computing device 112 having a touch-screen display 114, and a user photograph 116 for manipulation by various features of the digital collage creation kit 78. In embodiments, the user can take a picture in the application, such as by using a camera associated with the computing device 112. In other embodiments, the user may import a photo from the computing device 112 storage/memory. As shown in FIG. 13, the user may then extract a portion of the user photograph 116 for manipulation using the digital collage creation kit 78. In embodiments, the user can easily cut out the area of the photo he wishes to use in the digital collage, such as by using the digital photo cutter 31 to produce a cut-out edge 118. Generally, "cutting out" refers to extracting at least a portion of a desired image. For example, a user may produce a cut-out edge 118 by freehand drawing.

In other instances, a user may select a predefined cut-out shape to be used in producing the cut-out edge 118. For example, a user may select a rectangular shape that is overlaid on the photograph, wherein the outline of the rectangular shape corresponds to the cut-out edge 118. The user may then use the digital photo cutter 31 to adjust the scale and position of the rectangular shape, thereby customizing the cut-out edge 118. Other cut-out shapes, such as circles, ovals, polygons, and other shapes, are included within the scope of the present invention. For example, an oval cut-out shape may be selected and placed on the user photograph 116. The oval cut-out may then be adjusted in terms of scale, proportion, dimensions, position, or other characteristics, until a cut-out edge corresponding to the oval cut-out frames the face in the user photograph 116, such that the face may be extracted from the remainder of the photograph. These adjustments may be made using the digital photo cutter 31. In this way, cut-out shapes may be used in addition to, or instead of, a freehand drawing of a cut-out edge 118. Furthermore, other options for automatically cropping or trimming a photograph may be included within the scope of the present invention.

Figure 15:
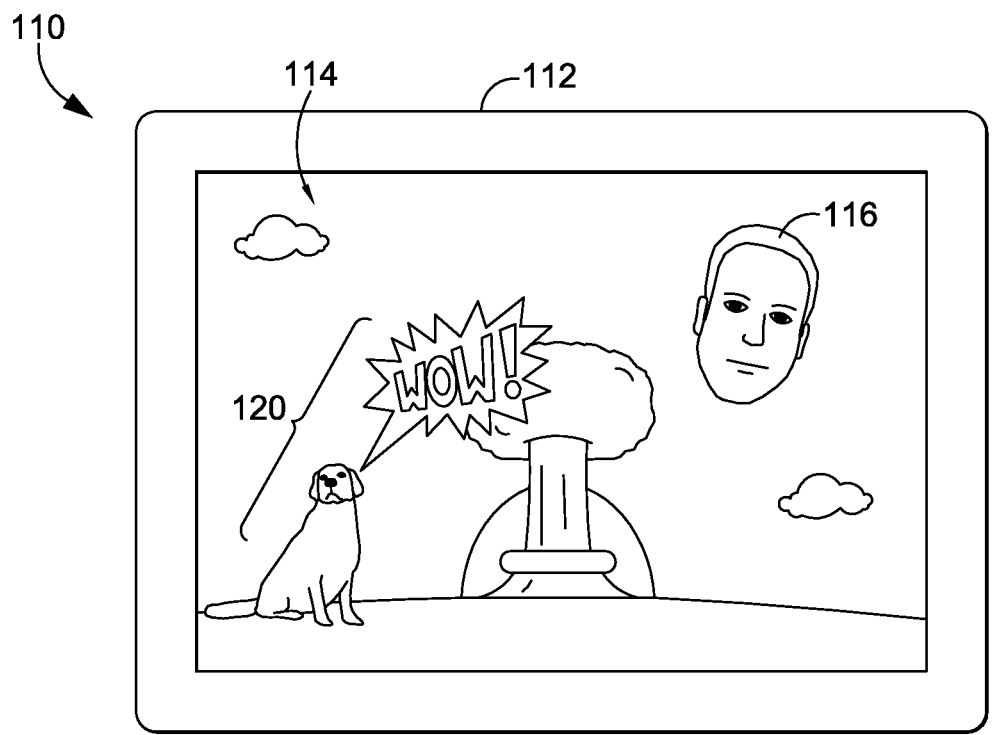
FIG. 15 is a top view of a computing device executing an application, in accordance with an embodiment of the invention.

Having generated a cut-out edge 118 around the desired portion of the user photograph 116, the user may also eliminate unwanted portions of the background behind the user's image from the collage, as shown in FIG. 14. As such, having removed the remainder of the user photograph 116 that is included in FIG. 13 and the remainder of the background that is included in FIG. 14, a user can further customize the digital photo collage using selected backgrounds, additional photos, stamps applied using the digital stamper 34, and other enhancements using the digital collage creation kit 78. In FIG. 15, the user has applied a background to the touch-screen display 114, manipulated the location of the remaining portion of user photograph 116, and added additional digital enhancements 120.

Figure 16:
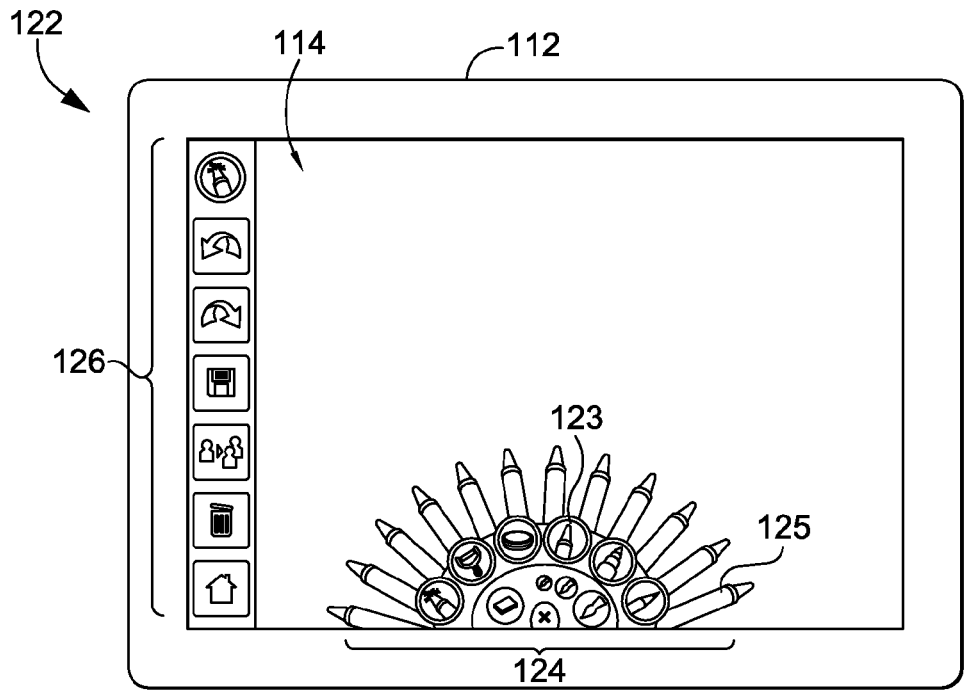
FIG. 16 is a top view of an exemplary user interface, in accordance with an embodiment of the invention.
Figure 17:
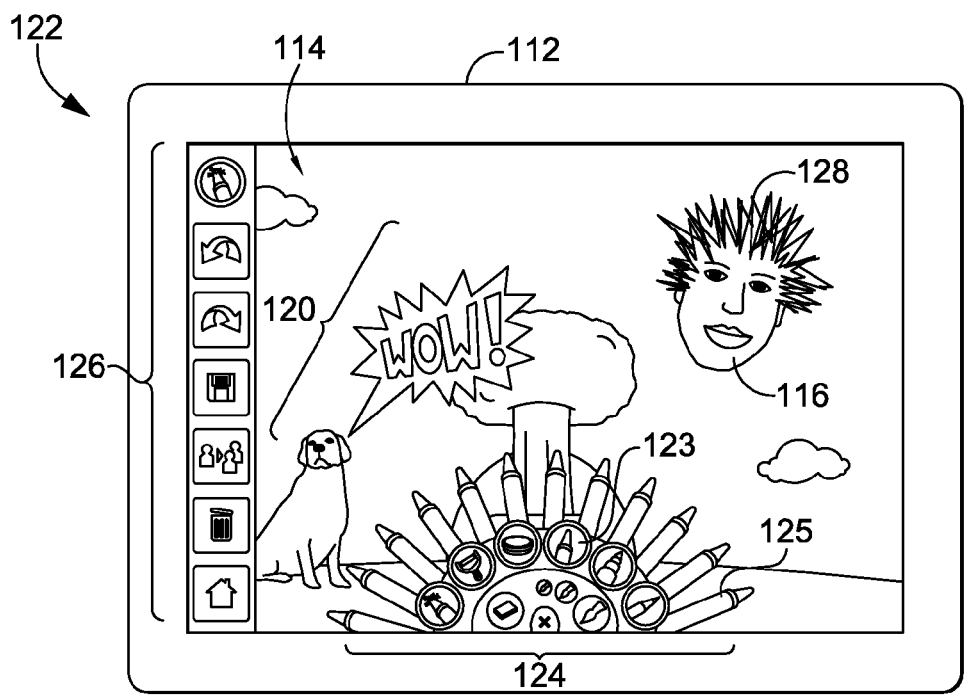
FIG. 17 is a top view of an exemplary user interface, in accordance with an embodiment of the invention.

With reference now to FIG. 16, an exemplary user interface 122 displayed on the touch-screen display 114 of the computing device 112 includes a plurality of menu items 126 and a color control 124, which includes a plurality of coloring tool indicators corresponding to a plurality of coloring tools, such as coloring tool 123. In embodiments, the color control 124 is a wheel, which includes coloring tools 123 organized according to color, as indicated by color options 125. In such an embodiment, a user may spin the color control 124 in order to view a number of color options 125. The coloring tools 123 may include pencils, crayons, markers, stamps, paint rollers, paintbrushes, spray paint, sparkles, and other coloring tools having various colors. In embodiments, a user may toggle between these various tool types. In the embodiment of FIG. 17, a drawing enhancement 128 is added to the digital collage of FIG. 15, based on a user selecting one or more of the features from the menu items 126, color control 124, and/or coloring tools 123.

Figure 18:
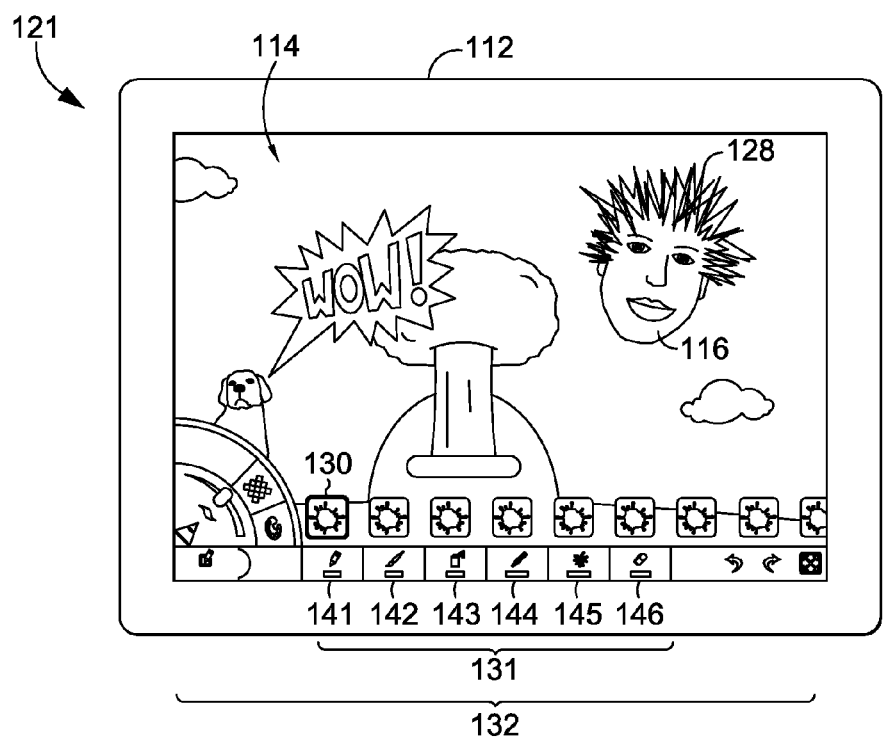
FIG. 18 is a top view of an exemplary user interface, in accordance with an embodiment of the invention.

The user interface 121 of FIG. 18 illustrates an additional embodiment of a color control including a plurality of coloring tools. The color control 132 is not a wheel, as is the color control 124 shown FIG. 17, but is instead a panel of indicators corresponding to various coloring tools and options. For example, coloring tool indicators 131 correspond to various coloring tools, including a pencil tool 141, paint brush tool 142, spray paint tool 143, crayon tool 144, sparkle tool 145, and eraser tool 146. The sparkle tool 145 may provide, for example, a colored and/or textured marking overlaid with an animated sparkling effect. The color control 132 may further include a variety of color, texture, and special effects indicators, such as color swatch 130. Such swatches may correspond to multiple colors, textures, and special effects. A user may scroll through these indicators and select a desired color, texture, or special effect to be used in conjunction with a selected coloring tool.

A digital collage creation environment, such as the digital collage creation environment 87 of FIG. 8, may provide a number of predefined features and effects that may be used in creating a digital collage. For example, the digital collage creation environment may provide a number of predefined photo effects, such as morphing effects, filters, automatic corrections, contrast adjustments, etc. In this way, a user may morph a photograph according to a predefined morphing effect, in addition to or instead of, for example, using the digital transforming tool 82. Other standard features and effects may be included in the digital collage creation environment, such as backgrounds, borders, fonts, and other features and effects that may be incorporated into a digital collage. Thus, a user may select a background from a number of background options to be included in the digital collage. Similarly, a user may select a border, such as a border for a photograph, from a number of border options.

Figure 19:
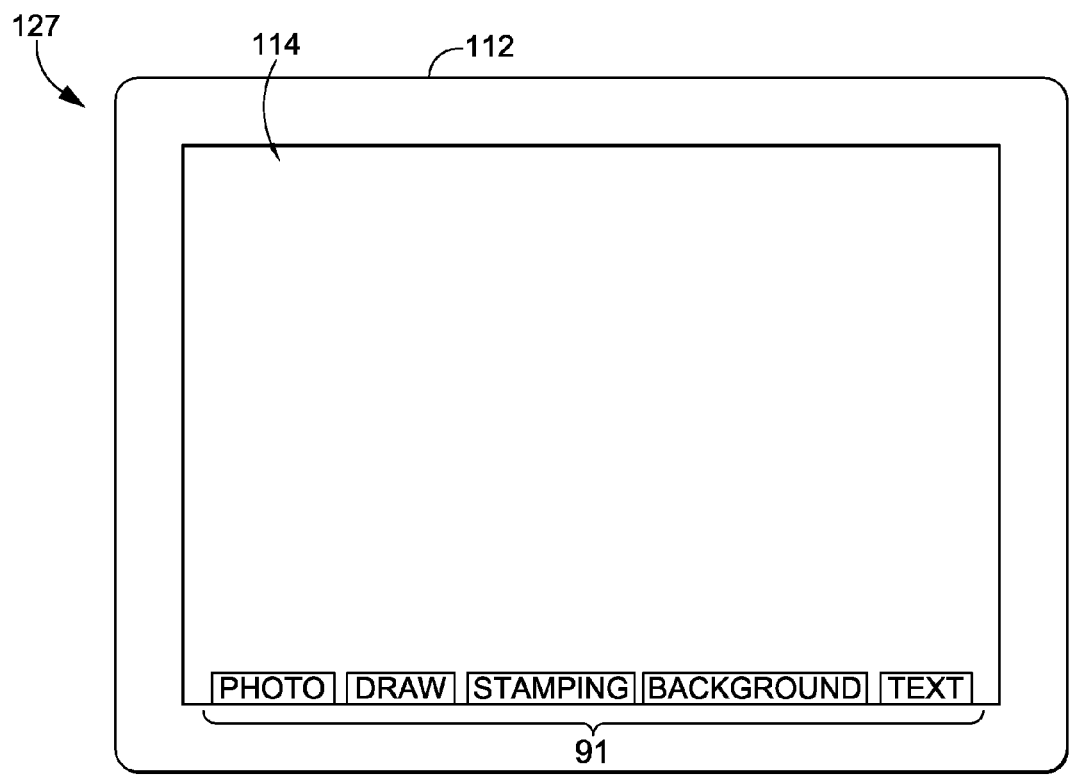
FIG. 19 is a top view of an exemplary user interface, in accordance with an embodiment of the invention.

Turning now to FIG. 19, a user interface 127 is provided. The user interface 127 may be used to navigate and select various features and menu options in a digital collage creation environment, including menu options 91. These features and menu options may be utilized by a user in order to create a digital collage. For example, a user may select a "photo" indicator to access a number of photo-related features and/or functions, including options such as "get photo," "morph," "cut," "photo effects," "corrections," and "blur." It should be noted that these photo-related features and/or functions may be accessed in a number of other ways, as well, such as by selecting the "start with a photo" indicator 95 of FIG. 9A.

The "get photo" option may allow a user to select a photo from a photo library stored on the computing device 84 or from a photo library provided in the digital collage creation environment. The "get photo" option may further allow a user to take a photo using a camera of the computing device 84. The "morph" option may provide a number of predefined morphing effects that may be applied to a photo, such as predefined effects for stretching, swirling, melting, morphing, blending, smearing, swiping, image twisting, color changing, pixelating, and/or smudging. The "cut" option may provide a number of cutting, cropping, and trimming functions, including those discussed with respect to FIGS. 12-14. The "photo effects" option may include, for example, a number of pixelating effects, color filters, and other visual effects, which may be applied to a photo. The "corrections" option may provide features for adjusting brightness, contrast, color intensity, sharpness, as well as other photo enhancement effects. The "blur" option may allow a user to blur an entire photo and/or a portion of a photo, such as a blurring effect around the edges of the photo.

Continuing on with respect to FIG. 19, a user may select a "draw" indicator from the user interface 127 to access a number of drawing-related features and/or functions. Again, it should be noted that these drawing-related features and/or functions may be accessed in a number of other ways, such as by selecting the "start to draw" indicator 101 of FIG. 9A. These features and/or functions may include drawing tool options, such as a pencil, brush, spray, crayon, sparkle, and eraser. Upon selecting a drawing tool, a user may further select a color from a color palette, or a special coloring effect from a special coloring effects palette. A special coloring effects palette may include options other than solid colors or conventional patterns. For example, it may include an option that imitates the appearance of grass blades, gold, a random array of crayons, foil, and any other number of figures, objects, or scenes. When a user selects such a special effect and begins drawing, the drawn markings may include the special coloring effect appearance. For example, if a user wishes to draw grass, a user may select the special coloring effect corresponding to blades of grass, and then, when the user draws, the drawn marking includes blades of grass.

A user may further select a "stamping" indicator from the user interface 127. The stamping-related features and/or functions associated with this indicator may also be accessed by selecting the "start with a stamp" indicator 97 of FIG. 9A, or by simply touching the digital stamper 34 to the touch-screen of the computing device 84. The stamping-related features and/or functions may include static stamps, animated stamps, and interactive stamps. The stamps may further be divided into categories, such as a facial feature category, sports category, travel category, and any other number of categories.

A "background" indicator included in the user interface 127 may be selected to access a number of predefined backgrounds and borders. A user may select a background or border from a number of backgrounds and borders. Such backgrounds and borders may include solid colors, patterns, and scenes. They may also include animated effects, such that when the background or border is added to a digital collage, an animated effect is also added. An audio effect might also be associated with these background and border options. The predefined backgrounds and borders may also be accessed by selecting the "start with a background" indicator 99 of FIG. 9A.

A user may select a "text" indicator in the user interface 127 to view a number of text-related options. For example, a user can select a font, color, special effect, or other text-related features and/or functions. Upon selecting a desired feature and/or function, the user may then add text to a digital collage.

Figure 20:
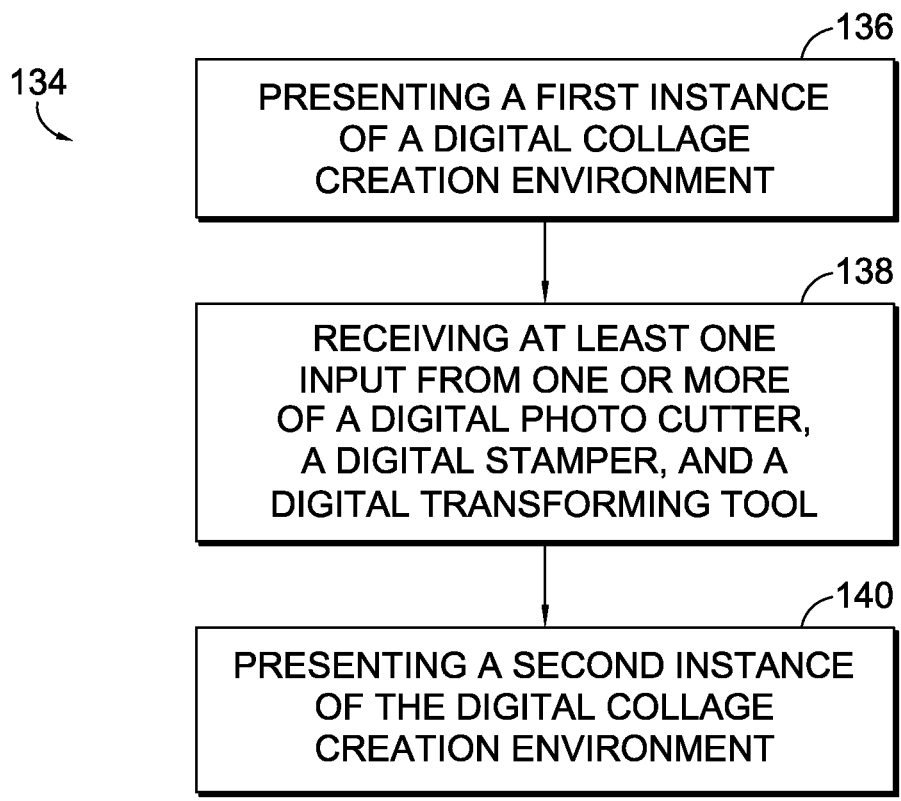
FIG. 20 is a flow diagram including steps for providing an interactive digital collage, in accordance with an embodiment of the present invention.

Turning now to FIG. 20, the flow diagram 134 includes steps for providing an interactive digital collage. At step 136, a first instance of a digital collage environment is presented. At least one input is received, by way of the digital collage creation environment, at step 138. The at least one input may be received from one or more of a digital photo cutter, a digital stamper, and a digital transforming tool. Then, at step 140, a second instance of the digital collage creation environment is presented, wherein the second instance corresponds to the received at least one input.

As mentioned, in embodiments, the digital collage creation kit 78 includes a digital collage creation kit application that, upon execution by the computing device 84, is configured to enable a user to create a digital collage in a digital collage creation environment. In further embodiments, the digital collage creation kit 78 includes an activation feature for such a digital collage creation kit application. The activation feature may include an activation code and/or an activation indicator, such as a web page, website URL, or other indicator of a resource from which a user may access one or more features of the application. In some embodiments, user interaction with the activation feature enables and/or activates a digital collage creation kit application retrieved by using the activation feature, and/or a digital collage creation kit application associated with the activation feature. In further embodiments, a non-user-specific application, such as Crayola ColorStudio HD™, is downloaded from an external source, and the specific features for the digital collage creation kit application may then be activated and/or "unlocked," by an activation feature. In this instance, the activation feature may involve touching a component included in the user-specific kit to the touch-screen of the computing device 84 running the non-user-specific application. For example, a user may download ColorStudio HD™ to a computing device 84, and then touch a digital stamper included in a user-specific digital collage creation kit, such as the digital stamper 34 of FIG. 8, to the touch-screen of the computing device 84 in order to activate specific features associated with the digital collage creation kit application. In other embodiments, a digital transforming tool, such as the digital transforming tool 82 of FIG. 8, is used to unlock and/or activate the digital collage creation kit application.

Upon enabling/activation, the digital collage creation kit application may be accessed, retrieved from, downloaded, and/or otherwise interacted with via a source separate from the digital collage creation kit 78. For example, the digital collage creation kit application may be accessed and/or downloaded from a website, a database, a data store, or any other external source that may provide applications. An example of an external source is the online iTunes® store.

Embodiments of the digital collage creation kit 78 further include an application that provides a first tier of options available to a user upon purchase of the digital collage creation kit 78, and a second tier of options available to the user upon "unlocking" a full mode of the digital collage creation kit 78. In one example, a user may purchase the digital collage creation kit 78, which may include an application that enables the user to access a "try me" mode of the product. The "try me" mode may allow, for example, a user to import only one photo and utilize a limited number of stamps and/or backgrounds, etc. In another example, the user may "unlock" a full mode of the purchased digital collage creation kit 78 to activate additional options such as access to additional backgrounds and stamps, the ability to import multiple photos, and other features of the digital collage creation kit 78 that may be limited and/or restricted based on which mode a user is executing. In one embodiment, a digital stamper 34 is used to unlock additional features of the digital collage creation kit 78. In other embodiments, the digital stamper 34, or another component included in the digital collage creation kit 78, may be used to activate and/or unlock a particular mode of the application, such as a limited mode or a full mode. In one embodiment, a particular user interaction screen associated with the digital collage creation kit application may be presented to a user for activation of the digital collage creation kit application and/or features. For example, additional enhancement options corresponding to the use of one or more of the digital tools may be enabled based on activation of the digital collage creation kit application.

The following U.S. patent applications are hereby incorporated by reference in their entirety: U.S. Provisional Application No. 61/788,371 entitled "Digital Coloring Tools Kit with Panoramic View and Create-to-Destroy Interactive Features," filed Mar. 15, 2013; U.S. Nonprovisional application Ser. No. 14/211,815, entitled "Panoramic Coloring Kit," filed Mar. 14, 2014; U.S. Nonprovisional application Ser. No. 14/213,544, entitled "Digital Coloring Tools Kit with Dynamic Digital Paint Palette," filed Mar. 14, 2014; U.S. Provisional Application No. 61/788,349, entitled "Personalized Digital Animation and Digital Collage Creation Kit," filed Mar. 15, 2013; U.S. Nonprovisional application Ser. No. 14/213,564, entitled "Personalized Digital Animation Kit," filed Mar. 14, 2014; U.S. Provisional Application No. 61/788, 381, entitled "Digital Fashion Portfolio and Green Screen Animation Kit,"; and U.S. Nonprovisional application Ser. No. 14/213,586 entitled "Coloring Kit for Capturing and Animating Two-dimensional Colored Creation," filed Mar. 14, 2014.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A digital collage creation kit comprising:
    an activation feature for a digital collage creation kit application; and
    a plurality of digital input devices, wherein each of the plurality of digital input devices is configured to interact with a touchscreen of a computing device executing the digital collage creation kit application, the plurality of digital input devices comprising:
        a digital transforming tool comprising a stylus having a body coupled to two digital touch points, wherein the digital transforming tool provides a morphine effect based on each of the two digital touch points contacting the touchscreen of the computing device, and
        at least one of a digital photo cutter or a digital stamper.

2. The digital collage creation kit of claim 1, wherein upon executing the digital collage creation kit application by the computing device, the digital collage creation kit application is configured to generate a digital collage creation environment, in which a digital collage is created based on input received from one or more of the plurality of digital input devices.

3. The digital collage creation kit of claim 2, wherein the plurality of digital input devices comprises the digital photo cutter, and wherein the digital photo cutter comprises a single-point stylus for selecting an item in the digital collage.

4. The digital collage creation kit of claim 3, wherein the digital photo cutter is configured to extract a portion of an image in the digital collage.

5. The digital collage creation kit of claim 4, wherein extracting the portion of the image comprises receiving a user input, by way of the digital photo cutter, of a cut-out edge.

6. The digital collage creation kit of claim 5, wherein the cut-out edge comprises a predefined cut-out shape included in the digital collage creation environment.

7. The digital collage creation kit of claim 2, wherein the plurality of digital input devices comprises the digital stamper, and wherein the digital stamper comprises a multiple touch-point digital stamper for adding one or more new items to the digital collage.

8. The digital collage creation kit of claim 7, wherein the one or more new items include at least one of an animation or an audio effect.

9. The digital collage creation kit of claim 8, wherein the one or more new items include the audio effect, and wherein the audio effect is based on a user input at a microphone of the computing device.

10. The digital collage creation kit of claim 2, wherein the digital collage creation environment includes a color control including a plurality of coloring tools.

11. The digital collage creation kit of claim 2, wherein the digital collage creation environment includes a plurality of predefined background images for creating the digital collage.

12. The digital collage creation kit of claim 1, wherein the morphing effect comprises at least one of a stretching, swirling, melting, blending, smearing, swiping, image twisting, color changing, pixelating, or smudging effect.

13. A method of providing an interactive digital collage, the method comprising:
    providing for presentation at a computing device a first instance of a digital collage creation environment;
    receiving, by way of the digital collage creation environment, an input from at least one of a plurality of digital input devices, wherein each of the plurality of digital input devices is configured to interact with a touchscreen of the computing device, the plurality of digital input devices comprising:
        a digital transforming tool comprising a stylus having a body coupled to two digital touch points, wherein the digital transforming tool provides a morphine effect based on each of the two digital touch points contacting the touchscreen of the computing device, and
        at least one of a digital photo cutter or a digital stamper; and
    providing for presentation at the computing device a second instance of the digital collage creation environment, wherein the second instance corresponds to the received input.

14. The method of claim 13, wherein the digital collage creation environment includes a plurality of predefined background images for creating the interactive digital collage.

15. The method of claim 13, wherein the digital collage creation environment includes a plurality of predefined morphing options available for user selection.

16. The method of claim 13, wherein the digital stamper is further configured to unlock at least one feature in the digital collage creation environment.

17. A digital collage creation kit comprising:
    an activation feature for an application that when executed by a computing device generates a digital collage creation environment in which a digital collage is created based on user input; and
    a plurality of digital input devices, wherein each of the plurality of digital input devices is configured to interact with a touchscreen of the computing device executing the application, the plurality of digital input devices comprising:
        a digital transforming tool comprising a stylus having a body coupled to two digital touch points, wherein the digital transforming tool provides a morphine effect based on each of the two digital touch points contacting the touchscreen of the computing device, and
        at least one of a digital photo cutter or a digital stamper, wherein the digital photo cutter comprises a single-point stylus for selecting an item in the digital collage, and wherein the digital stamper comprises a multiple touch-point stamper for adding one or more new items to the digital collage.

18. The digital collage creation kit of claim 17, wherein the digital collage creation environment includes a plurality of predefined morphing options available for user selection.

19. The digital collage creation kit of claim 17, wherein the digital stamper is further configured to unlock at least one feature in the digital collage creation environment.

20. The digital collage creation kit of claim 17, wherein the digital collage creation environment includes a color control including a plurality of coloring tools.

* * * * *